(12) United States Patent
Norwood et al.

(10) Patent No.: US 6,266,472 B1
(45) Date of Patent: *Jul. 24, 2001

(54) POLYMER GRIPPING ELEMENTS FOR OPTICAL FIBER SPLICING

(75) Inventors: Robert A. Norwood, West Chester, PA (US); Brian Brown, Montvalle, NJ (US); Jason Holman, Waltham, MA (US); Lawrence W. Shacklette, Maplewood, NJ (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/390,112

(22) Filed: Sep. 3, 1999

(51) Int. Cl.[7] ............................................. G02B 6/00
(52) U.S. Cl. ........................................................ 385/137
(58) Field of Search ................................ 385/27, 15, 49, 385/83, 88, 89, 137, 95, 12, 96, 11, 123, 42, 147; 156/158; 65/385, 403

(56) References Cited

U.S. PATENT DOCUMENTS

| | | |
|---|---|---|
| 4,474,423 | 10/1984 | Bisbee et al. . |
| 4,565,593 | 1/1986 | Marr . |
| 4,659,175 | 4/1987 | Wilde . |
| 4,735,677 | 4/1988 | Kawachi et al. ............. 156/633 |
| 4,750,799 | 6/1988 | Kawachi et al. ............. 350/96.11 |
| 4,755,021 * | 7/1988 | Dyott ............................ 385/12 |
| 4,765,704 | 8/1988 | Pers . |
| 4,767,174 | 8/1988 | Carenco et al. ............. 350/96.2 |
| 4,796,975 | 1/1989 | Lukas et al. ................. 350/320 |
| 4,828,362 | 5/1989 | Skinner et al. . |
| 4,832,438 | 5/1989 | Engel et al. . |
| 4,911,522 | 3/1990 | Iwamoto et al. . |
| 4,950,318 * | 8/1990 | Dyott et al. .................. 65/403 |
| 4,969,705 | 11/1990 | Stoy et al. . |
| 4,973,127 | 11/1990 | Cannon, Jr. et al. . |
| 5,011,259 | 4/1991 | Lieber et al. . |
| 5,024,505 | 6/1991 | Junji et al. ................... 350/96.22 |
| 5,031,984 * | 7/1991 | Eide et al. .................... 385/27 |
| 5,046,808 | 9/1991 | Chang . |
| 5,046,809 | 9/1991 | Stein . |
| 5,046,813 | 9/1991 | Itoh et al. . |
| 5,080,458 | 1/1992 | Hockaday . |
| 5,134,470 | 7/1992 | Ravetti . |
| 5,138,681 * | 8/1992 | Larson et al. ................ 385/95 |
| 5,159,653 * | 10/1992 | Carpenter et al. ........... 385/95 |
| 5,170,456 | 12/1992 | Itoh et al. . |
| 5,189,717 * | 2/1993 | Larson et al. ................ 385/95 |
| 5,222,171 | 6/1993 | Straus . |
| 5,239,601 | 8/1993 | Denis et al. . |
| 5,249,246 | 9/1993 | Szanto . |
| 5,359,687 | 10/1994 | McFarland et al. .......... 385/49 |
| 5,835,659 * | 11/1998 | Ota et al. ..................... 385/137 |

* cited by examiner

*Primary Examiner*—Akm E. Ullah
(74) *Attorney, Agent, or Firm*—Nixon & Peabody LLP

(57) ABSTRACT

The invention relates to the art of optical fiber splicing. More particularly, the invention pertains to methods of splicing optical fibers with other optical fibers or optical waveguides. The invention provides optical fiber splicing elements useful for coupling optical fibers and for alignment of optical fibers with waveguides. The splicing elements allow for accurate lateral and longitudinal alignment and improved collinearity of spliced optical fibers, achieving low coupling loss.

17 Claims, 10 Drawing Sheets

POLYMER GRIPPING ELEMENTS FOR OPTICAL FIBER SPLICING

BACKGROUND OF THE INVENTION

1. Field of the Invention

The invention relates to the art of optical fiber splicing. More particularly, the invention pertains to methods of splicing optical fibers with other optical fibers or optical waveguides. The invention further provides optical fiber splicing elements useful for coupling optical fibers and for alignment of optical fibers with waveguides. The splicing elements allow for accurate lateral and longitudinal alignment and improved collinearity of spliced optical fibers, achieving low coupling loss.

2. Description of the Related Art

Recent developments in the area of optical communications have provided a large number of devices for the control and routing of light. These devices can be characterized as passive devices, those which serve only to route the propagation of light along a particular path, and active devices, those which control some function of the propagating light, such as its intensity or polarization, or which dynamically control the path along which the light propagates. Optical fibers have been the medium of choice in the field of optical communications for long distance propagation of light due to their excellent transmission characteristics and ability to be fabricated in lengths of many kilometers.

Light propagates through the core region of optical fibers and these core regions can be as small as a few microns in diameter. At some point multiple optical fibers must be joined together, and the more compact and less loss-inducing the connection can be, the better.

Accordingly, the accurate alignment of fibers is critical to preclude wasting a substantial amount of light through the coupling. Further, as optical devices continue to shrink, and integration of multiple devices on a single chip becomes more popular, planar fiber positioning elements become more valuable. Numerous articles and methods have been devised in the prior art to provide planar fiber positioning elements which allow for efficient coupling of optical fibers to substrates. The need for critical alignment tolerances has resulted in a high degree of complexity and cost for these devices and methods of the prior art.

There are many descriptions of methods which utilize silicon "V-grooves" as fiber positioning elements. U.S. Pat. No. 4,767,174 makes use of the fact that certain crystalline orientations of silicon substrates can be preferentially etched to a high degree of accuracy. This is accomplished by a series of lithographic steps including resist coating and exposure, followed by liquid etching. However, once the V-groove is fabricated, it serves only to position the optical fiber relative to the surface of the silicon substrate. It still remains to position the fiber end relative to the end of any other features on the substrate, such as optical waveguides. This is usually accomplished by micromanipulation of the two components relative to each other followed by fixing the alignment by an optical quality glue. Micromanipulation is an expensive and time consuming operation for use in a manufacturing operation.

Alternatively, the V-groove and optical fiber can be positioned relative to a waveguide by the use of additional positioning elements, but these also increase the complexity and cost of the method. Even when the V-groove technique is utilized only to couple two optical fibers to one another, as in U.S. Pat. No. 4,973,126, there are several additional positioning elements required. Also, the V-groove techniques serve to position an optical fiber relative to some surface, such as that of the silicon itself, but the V-groove does not provide any force to retain the optical fiber in position. That is, the optical fiber can easily slip out of the groove unless one or more additional elements are present to provide some retaining force. Typically, a cover plate or a second substrate containing V-grooves is forced down in contact with the optical fibers to hold them in the V-grooves and an optical cement or photopolymer is used to hold the assembly together.

U.S. Pat. No. 4,735,677 describes a method for providing guides for aligning optical fibers on the surface of a silicon substrate. In this method it is necessary to first grow a layer of glass on the silicon wafer by a soot process wherein a glass precursor is treated by flame hydrolysis to deposit glass particles on the silicon, followed by heating in an electric furnace to consolidate the glass. This layer of glass is then lithographically patterned and etched, as by reactive ion etching (RIE), to form the positioning elements. After formation of these elements, an optical fiber can be inserted between them and fixing is accomplished with an adhesive or by melting the glass with a $CO_2$ laser beam. This technique involves a great number of processing steps and is limited to substrates which are not damaged by high temperature processes or those which do not contain sensitive electronic devices which would be damaged by an RIE etch. Further, like the V-groove techniques, it serves only to position the optical fibers yet provides no rigidity or retaining force to the coupling except through the addition of an adhesive or another high temperature melting process.

U.S. Pat. No. 4,796,975 teaches a method of aligning and attaching optical fibers to substrate optical waveguides. One or more slabs of preferentially etchable material and a waveguide substrate are placed adjacent to each other face down on a flat surface for aligning the tops of the slabs with the top of the waveguide. A backing plate is secured to the back surface to hold the entire assembly together. The preferentially etchable material is thereafter etched to form V-grooves in alignment with the light guiding region of the waveguide substrate. Thereafter, optical fibers are secured thereto in an optically aligned manner with the light guiding region. In another aspect, the invention is directed to a fiber pigtailed waveguide substrate manufactured in accordance with the method.

U.S. Pat. No. 4,750,799 teaches a hybrid optical integrated circuit having a high-silica glass optical waveguide formed on a silicon substrate, an optical fiber and an optical device coupled optically to the optical waveguide, and an optical fiber guide and an optical device guide on the substrate for aligning the optical fiber and the optical device at predetermining positions, respectively, relative to the optical waveguide. Islands carrying electrical conductors are disposed on the substrate, a first electrical conductor film is formed on the substrate, second electrical conductor films are formed on the top surfaces of the optical waveguide, the optical fiber guide, the optical device guide and the islands and are electrically isolated from the first electrical conductor film.

U.S. Pat. No. 5,359,687 teaches an optical coupling device comprising a substrate having a surface region at a pre-determined position on a surface of said substrate for placement of an optical waveguide, a channel on the surface of the substrate for optically aligning and coupling an optical fiber and an optical waveguide positioned at the predetermined position, wherein the longitudinal axis of the channel is in alignment with the predetermined position such that on placement of the optical fiber in the channel and placement of the optical waveguide in the position the light carrying core of the fiber and the waveguide are substantially in optical alignment.

None of these prior disclosures teach the ability to precisely and accurately position fibers on almost any flat substrate, while taking up very little space. The object of the present invention provides a secure retaining force to the optical fiber without the need for additional elements held in place by optical adhesives or thermal heat treatments and requires no complex manufacturing steps or elaborate alignment by a micromanipulator. The invention provides strips of polymeric splice elements, also known as elastomeric polymer grippers, to provide a splice means for optical fibers. Once these grippers are deposited on a substrate, optical fibers can be snapped between them and positioned in close contact to minimize loss of propagation. Also, through adjustment of the length of the grippers and their separation distance, lateral and longitudinal alignment, and collinearity are easily controlled.

SUMMARY OF THE INVENTION

The invention provides a process of splicing optical fibers comprising: A) providing an optical fiber splicing element comprising a substrate and at least one optical fiber gripper on the substrate, wherein said gripper comprises adjacent parallel, polymeric strips each having a base attached to a surface of the substrate, a top surface in a plane parallel to the substrate, and side walls which form a groove between adjacent strips; and B) juxtapositioning complementary ends of first and second optical fibers in the groove.

The invention also provides a process for splicing optical fibers comprising the steps of: A) providing a substrate; B) substantially uniformly depositing a photopolymerizable composition onto the substrate; C) imagewise exposing the photopolymerizable composition to actinic radiation and removing the nonimage areas while leaving the image areas in the form of at least one optical fiber gripper on the substrate, wherein said gripper comprises adjacent parallel, polymeric strips each having a base attached to a surface of the substrate, a top surface in a plane parallel to the substrate, and side walls which form a groove between adjacent strips; and D) juxtapositioning complementary ends of first and second optical fibers in the groove.

The invention further provides a process for splicing optical fibers comprising the steps of: A) providing a substrate; B) substantially uniformly depositing a polymerizable composition onto the substrate; C) embossing a pattern in the polymerizable composition in the form of at least one optical fiber gripper on the substrate, wherein said gripper comprises adjacent parallel, polymeric strips each having a base attached to a surface of the substrate, a top surface in a plane parallel to the substrate, and side walls which form a groove between adjacent strips; D) curing the polymerizable composition; and E) juxtapositioning complementary ends of first and second optical fibers in the groove.

Another aspect of the invention is an optical fiber splicing element comprising i) a substrate; and ii) an array comprising at least two optical fiber grippers on the substrate, wherein each of said grippers comprise adjacent parallel, polymeric strips each having a base attached to a surface of the substrate, a top surface in a plane parallel to the substrate, and side walls which form a groove in between adjacent strips; the grippers being positioned on the substrate such that their grooves are collinear.

Still another aspect of the invention is an optical fiber splicing element comprising i) a substrate; and ii) at least one optical fiber gripper on the substrate, wherein the gripper comprises adjacent parallel, polymeric strips each having a base attached to a surface of the substrate, a top surface in a plane parallel to the substrate, and side walls which form a groove between adjacent strips, and wherein the polymeric strips have an elastically deformable inner portion between the side walls.

Yet another aspect of the invention provides an optical fiber splicing article comprising i) a substrate; ii) at least one optical fiber gripper on the substrate, wherein said gripper comprises adjacent parallel, polymeric strips each having a base attached to a surface of the substrate, a top surface in a plane parallel to the substrate, and side walls which form a groove between adjacent strips; iii) at least one optical fiber inserted in the groove such that a portion of the fiber is bowed at a height over the groove; an end of the fiber being juxtapositioned with a complementary end of another optical fiber or waveguide; and iv) each of the optical fiber, the another optical fiber or waveguide, the at least one optical fiber gripper and at least a portion of the substrate being encapsulated in a substantially solid mass.

The invention also provides an optical fiber splicing article comprising i) a substrate; ii) an array comprising at least two optical fiber grippers on the substrate, wherein each of said grippers comprise adjacent parallel, polymeric strips each having a base attached to a surface of the substrate, a top surface in a plane parallel to the substrate, and side walls which form a groove in between adjacent strips; the grippers being positioned on the substrate such that their grooves are collinear; and iii) at least one optical fiber inserted in the grooves such that an end of the fiber is juxtapositioned with a complementary end of a waveguide which is fixed on the substrate.

DETAILED DESCRIPTION OF THE PREFERRED EMBODIMENT

Figure 1:
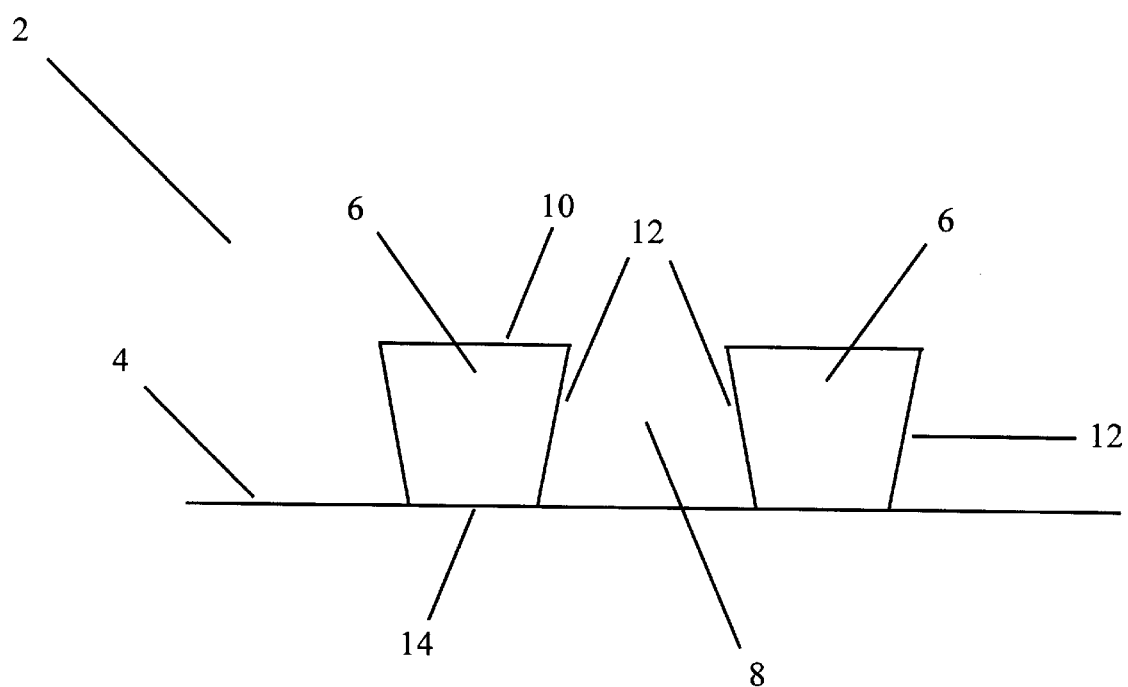
FIG. 1 is an edge view of a gripper, showing a cross-section of two adjacent polymeric strips.

The splicing elements of this invention are suitable for splicing optical fibers and for coupling optical fibers with waveguides or other optical devices. The grippers can act as single mode splices, including ribbon splices, achieving coupling losses below about 0.1 dB. The polymeric strips which form a gripper have an undercut shape that allows the gripper to grip an optical fiber as opposed to just providing horizontal alignment of a fiber. As depicted in FIG. 1, the splicing element comprises a gripper 2 positioned on a surface of substrate 4 wherein the gripper 2 comprises adjacent parallel, polymeric strips 6. Each of polymeric strips 6 has a base 14 attached to a surface of substrate 4, a top surface 10 in a plane parallel to the plane of substrate 4, and side walls 12 which form a groove 8 between the strips 6. Preferably each groove has a width at the base of the gripper which is greater than a width of the groove at the top surface of the gripper. A portion of the surface of the substrate 4 forms a floor of the groove 8 such that the groove has a width at the base of the gripper ($w_2$) which is greater than a width of the groove at the top of the gripper ($w_1$), or the width at its widest point above a cross-sectional height exceeding one half of the fiber diameter in the case where the top of the gripper may not be flat.

Figure 10:
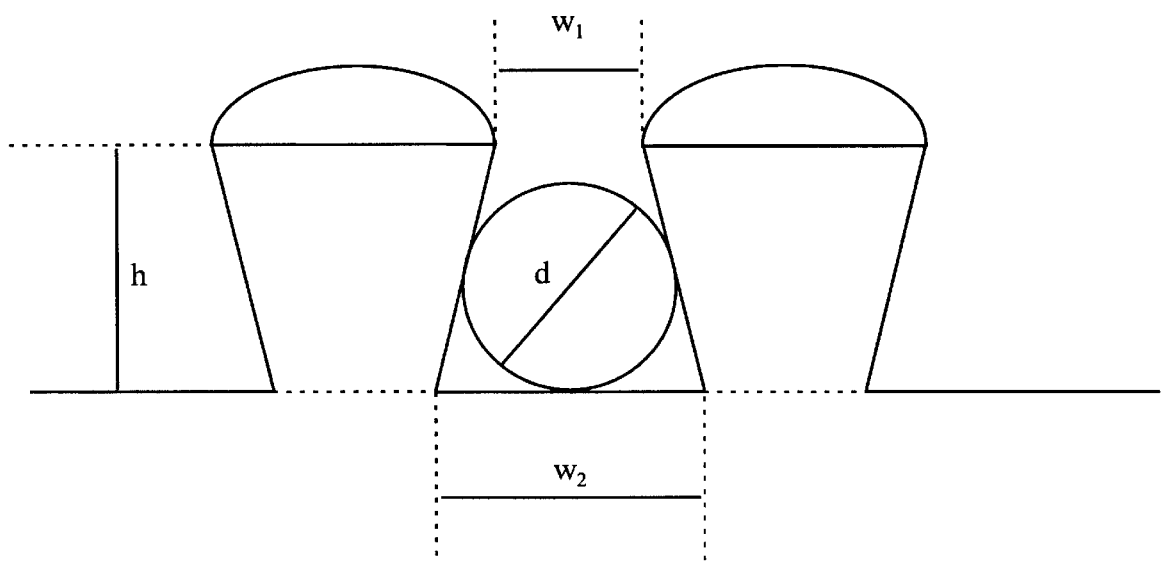
FIG. 10 shows a cross section of an optical fiber positioned in a gripper groove such that the groove has a width at the base of the gripper ($w_2$) which is greater than a width of the groove at the top of the gripper ($w_1$).

As shown in FIG. 10, in order to obtain a gripping action which holds the fiber vertically and horizontally along its axis and perpendicular to that axis, the following requirements must be met: $w_2 > w_1$, $w_2 \geq d$, $h > d/2$, and $w_1 < d$, where d is the fiber diameter and h is the height of its gripper at its widest point above a cross-sectional height exceeding one half of the fiber diameter. It is further required that the side walls 12 be sufficiently flat such that each strip 6 contacts the fiber at least at one point, such that the elastomeric gripper strips 6 exert a force on the fiber perpendicular to its axis. After insertion of a fiber, the width of the groove at the bottom of the gripper is approximately greater than or equal to the fiber diameter. The width of the groove at a height of greater than one-half of the fiber diameter is less than the diameter of the fiber and the gripper has a height above the substrate of at least one-half of the diameter of the fiber.

Figure 2:
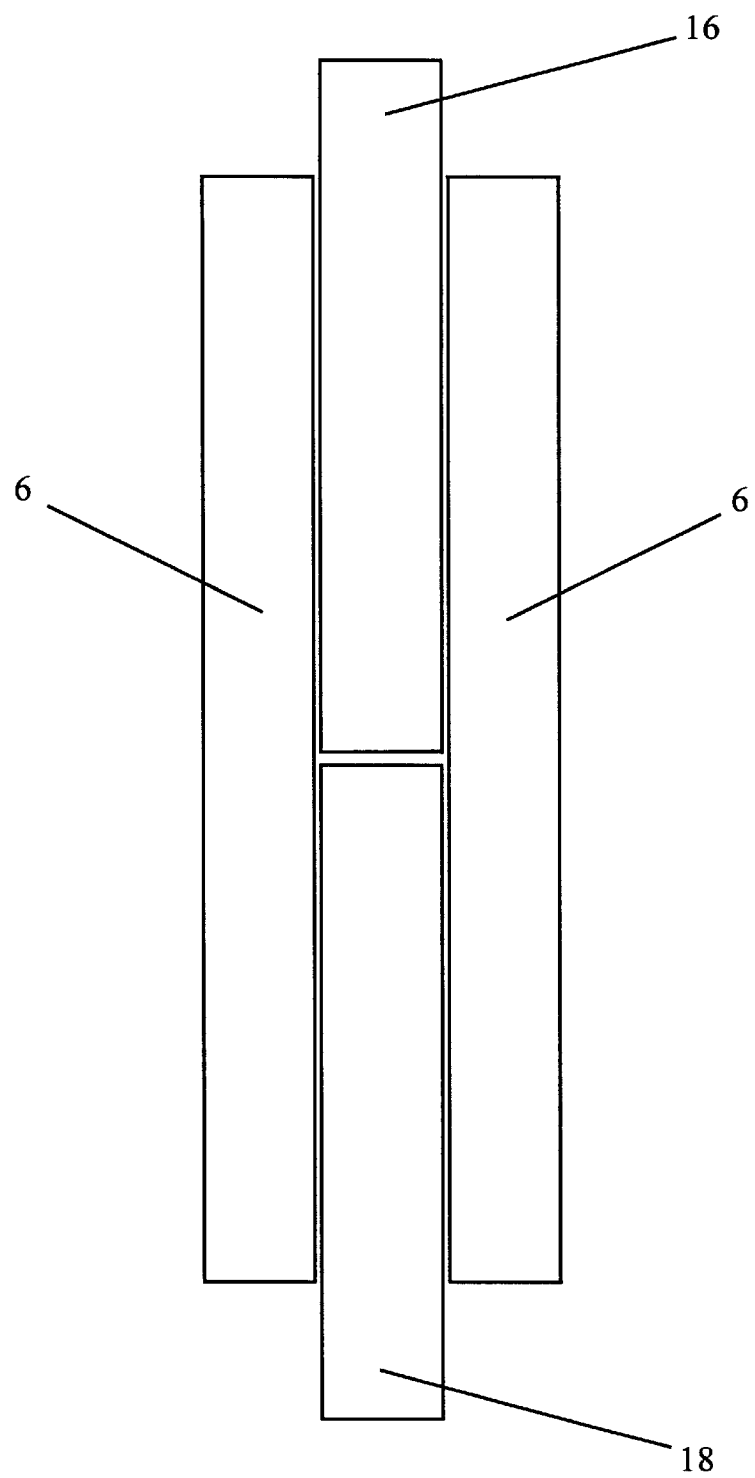
FIG. 2 is an overhead view of a gripper holding the ends of two optical fibers within its groove.
Figure 6:
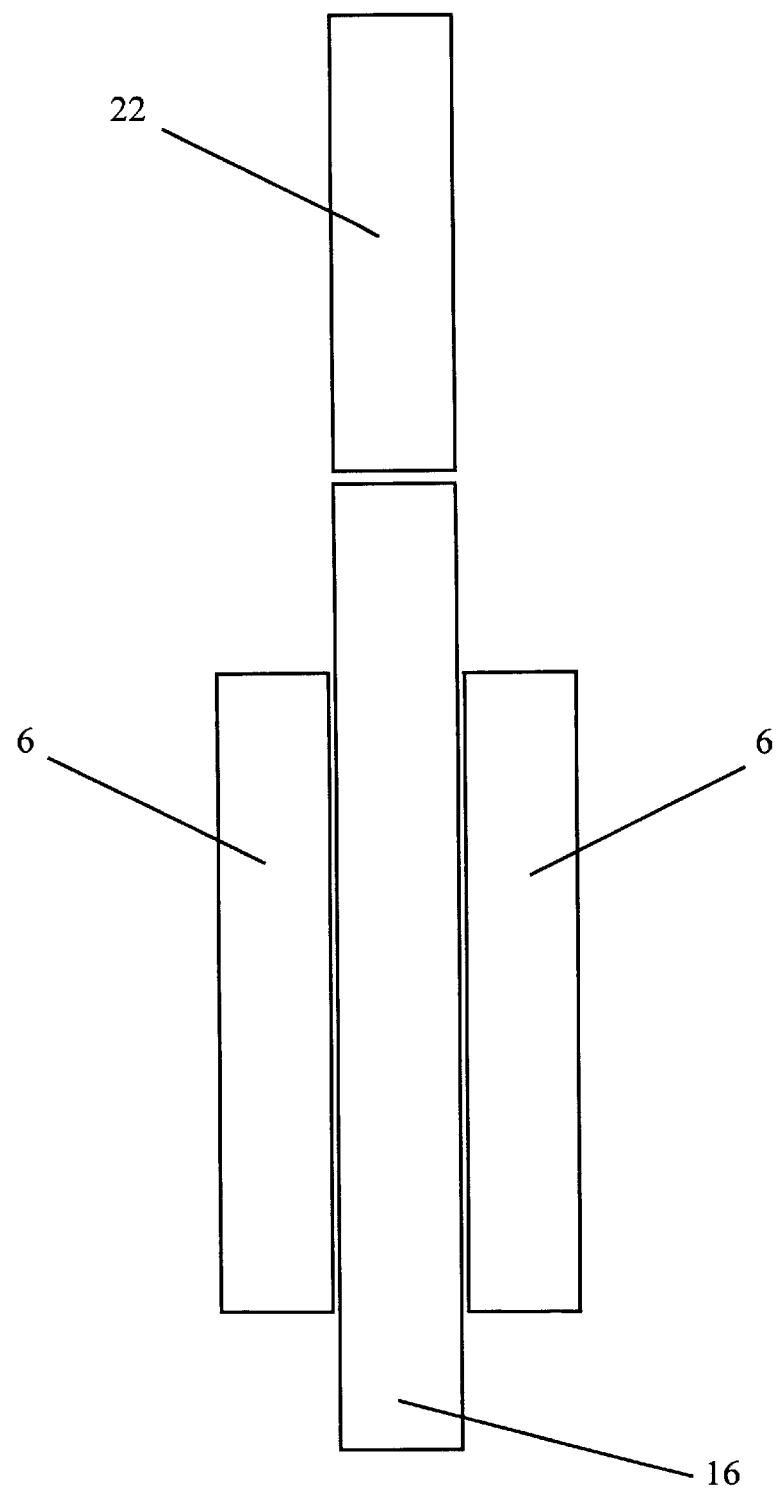
FIG. 6 is an overhead view of a gripper holding an optical fiber in alignment with a substrate mounted waveguide.

FIG. 2 shows an overhead view of a gripper 2 holding the ends of two optical fibers, 16 and 18, within its groove 8. Once strips 6 are fabricated on substrate 4 it is straightforward to insert optical fibers into groove 8 by juxtapositioning complementary ends of first optical fiber 16 and second optical fiber 18 into groove 8. The optical fibers are positioned in groove 8 such that the light carrying cores of optical fibers 16 and 18 are in optical alignment or substantially in optical alignment with each other such that light can be propagated through the cores with minimal loss of optical power. To ensure minimal loss, the ends of the fibers 16 and 18 should be complementary to each other. If the ends of the fibers are not already complementary, the ends may be cleaved at complementary angles, such as an angle perpendicular to their axis or at an angle ranging from about 5° to about 10°, to achieve a splice having good performance with greatly reduced back reflection. Each optical fiber is positioned into groove 8 one at a time, and the second fiber is preferably inserted by pushing it down into the groove near the first fiber and then sliding it along the groove until the ends of each optical fiber are separated by a distance of about 10 $\mu$m or less, preferably 5 $\mu$m or less, and most preferably 1 $\mu$m or less. Alternatively, an optical fiber may be inserted into a gripper and juxtapositioned with a waveguide, comprised of a cladding and a core, fixed to the substrate, as seen in FIG. 6, by sliding the fiber within the groove of the gripper until the distance between the waveguide and the fiber is 10 $\mu$m or less. An optional plateau under the waveguide can be employed to raise the core of the waveguide to bring it into vertical alignment with the core of the fiber. A shim can also be employed, having a portion within and between the gripper strips 6, which likewise can serve to adjust the height of the core of the fiber to match that of the core of the waveguide.

The optical fibers may be conventional single mode fibers, polarization-preserving fibers, multi-mode fibers or cable, UV-NIR transmissive fiber cable or hard polymer clad fiber cable. Waveguides suitable for use in this invention may be substantially parabolic, Gaussian, trapezoidal, square, rectangular or hemispherical in cross-section.

The grippers can be scaled in dimension to hold and position optical fibers of various common diameters such as 50, 125, 140, 250, and 900 microns. The height of the grippers must be greater than half of the diameter of the optical fiber, but does not need to be greater than the fiber. The taller the grippers are the smaller the separation distance must be for them to contact the fiber. However, the smaller the minimum separation distance, the more difficult it is to insert a fiber into the channel. The width of the grippers must be sufficient enough to allow adhesion to the substrate, yet narrow enough to bend and facilitate insertion of the fiber.

It is common practice to employ a coating on optical fibers to protect them from breakage. This coating can be left in place or can be stripped from the fiber to achieve a more accurate alignment. When left in place, the dimensions of the gripper and its groove must be scaled to accommodate the larger diameter of the fiber.

Likewise the invention may allow the insertion of two or more fibers in each gripper, thereby effecting a splice between 2 or more pairs of fibers. In this instance, the strips of the gripper must be placed further apart to allow the gripper to accommodate multiple fibers.

As an example of a design for holding a common telecommunications fiber of 125 $\mu$m diameter, the strips 6 are preferably separated by a center-to-center distance of from about 160 $\mu$m to about 250 $\mu$m on substrate 4, and more preferably from about 180 $\mu$m to about 220 $\mu$m. The most preferable center-to-center separation is about 200 $\mu$m. The height of strips 6 may range from about 70 $\mu$m to about 130 $\mu$m tall, and more preferably from about 100 $\mu$m to about 120 $\mu$m tall. The width of groove 8 at the upper surface of strips 6 may range from about 100 $\mu$m to about 120 $\mu$m, and more preferably from about 105 $\mu$m to about 115 $\mu$m, and at the bottom surface of strips 6 the width of groove 8 may range from about 120 $\mu$m to about 140 $\mu$m and more preferably from about 125 $\mu$m to about 135 $\mu$m. The length of strips 6 is preferably from about 0.1 to about 20 mm and is most preferably from about 1 to about 10 mm.

Polymeric strips 6 are formed using well known lithographic processes using photopolymerizable compositions and the like. First, a photopolymerizable composition is substantially uniformly deposited onto a surface of substrate 4. Next, the photopolymerizable composition is imagewise exposed to actinic radiation using either a laser which, when used together with a computer-controlled stage, can expose precise areas of the composition with the ultraviolet laser beam, or a collimated UV lamp together with a photomask having a pattern of substantially transparent and substantially opaque areas. The nonimaged areas are then removed with solvent, such as methanol, while leaving the imaged areas in the form of at least one optical fiber gripper on the substrate 4.

In another embodiment, polymeric strips 6 are formed by using a soft, flexible embossing tool to pattern the polymerizable composition in the form of at least one optical fiber gripper on the substrate. Such soft tooling is commonly made with silicones. The composition is then cured and the tool is removed. The flexibility of the tool must be sufficient so that it can be removed from the cured polymer without damaging the grippers. The polymerizable composition may be curable by various means, such as actinic radiation or heat, and should have a viscosity sufficient to conform to the raised features of the tool. After removing the tool from the cured composition at least one gripper will remain on the substrate, depending on the nature of the pattern. The pattern of the tool may include a plurality of grippers for multiple splices, if desired. Following the curing step, the substrate may optionally be trimmed to isolate the grippers to a small area.

Suitable photopolymerizable compositions include photopolymers formed by the photo-polymerization of a monomer or mixtures of such monomers with a suitable photoinitiator such as epoxies, urethane acrylates and methacrylates, ester acrylates and methacrylates, epoxy acrylates and methacrylates, polyethylene glycol acrylates and methacrylates, vinyl ether, other vinyl containing organic monomers, and mixtures thereof. Illustrative of such acrylate and methacrylate monomers are aryl diacrylates or methacrylates, triacrylates or methacrylates and tetra acrylates or methacrylates as for example mono-, di-, tri- and tetraacrylates or methacrylates of benzene, naphthalene, bisphenol-A, biphenylene, methane biphenylene, di-(trifluoromethyl)methane biphenylene, phenoxyphenylene and the like.

Useful monomers also include aliphatic acrylates, diacrylates, triacrylates and tetraacrylates as for example, butyl acrylate, ethylhexyl acrylate, phenoxyethyl acrylate, β-carboxylethyl acrylate, isobornyl acrylate, tetrahydrofurfuryl acrylate, cyclohexyl acrylate, propylene glycol monoacrylate, 2-(2-ethoxyethoxy) ethyl acrylate, N-vinyl pyrrolidone, 1,6-hexanediol diacrylate or dimethacrylate, neopentyl glycol diacrylate, diethylene glycol diacrylate or dimethacrylate, triethylene glycol diacrylate or dimethacrylate, tetraethylene glycol diacrylate or dimethacrylate, polyethylene glycol diacrylate or dimethacrylate, dipropylene glycol diacrylate, tripropylene glycol diacrylate, ethoxylated neopentyl glycol diacrylate, propoxylated neopentyl glycol diacrylate, aliphatic diacrylate, alkoxylated aliphatic diacrylate, aliphatic carbonate diacrylate, trimethylolpropane triacrylate or trimethacrylate, pentaerythritol triacrylate, ethoxylated trimethylolpropane triacrylate, propoxylated trimethylolpropane triacrylate, glyceryl proxylated triacrylate, tris (2-hydroxyethyl) isocyanurate triacrylate, pentaerythritol tetraacrylate, dipentaerythritol pentaacrylate, ditrimethylolpropane tetraacrylate, alkoxylated tetraacrylate.

The most preferred monomers include trimethylolpropane triacrylate, pentaerythritol triacrylate, ethoxylated trimethylolpropane triacrylate, glyceryl proxylated triacrylate, pentaerythritol tetraacrylate, dipentaerythritol pentaacrylate, ditrimethylolpropane tetraacrylate, methyl methacrylate, n-butyl acrylate, 2-ethylhexyl acrylate, isodecyl acylate, 2-hydroxyethyl acrylate, 2-hydroxypropyl acrylate, cyclohexyl acrylate, 1,4-butanediol diacrylate, ethoxylated bisphenol A diacrylate, neopentylglycol diacrylate, diethyleneglycol diacrylate, diethylene glycol dimethacrylate, 1,6-hexanediol diacrylate, and pentaerythritol tetra-acrylate.

Especially useful are mixtures wherein at least one monomer is a multifunctional monomer such as a diacrylate or triacrylate, as these will produce a network of crosslinks within the reacted photopolymer. The preferred monomer mixtures for use in the method of the invention are mixture of 33% urethane acrylate and 67% 1,6-hexanediol diacrylate; and the mixture of 67% ethoxylated bisphenol A diacrylate and 33% trimethylol propane triacrylate.

A wide variety of photoinitiators are suitable for use in initiating polymerization by UV light in the monomer mixtures. Preferred photoinitiators are those which are soluble in the preferred monomers and which have useful absorption at the wavelengths of light chosen for irradiation. If the necessary unique geometry of the photopolymer element is to be provided by the establishment of a gradient of photoinitiation events through the thickness of the monomer layer, then it is important that the layer has significant optical absorption at the irradiating wavelength. If the optical absorption of the constituent monomers is small at these wavelengths the requisite absorption may be provided by the photoinitiator. Combinations of several photoinitators are useful to broaden wavelength sensitivity or to increase loading solubility or to match the photospeed of the monomer system to the particular light source to be employed. Especially useful include 2-hydroxy-2-methyl-1-phenyl-propan-1-one (Darocur 1173), 2,2-dimethoxy-2-phenylacetophenone (Irgacure 651) and 1-hydroxycyclohexyl phenyl ketone sensitized 1:1 with benzophenone (Irgacure 500). An especially preferred mixture of photoinitiators is a 1:1:1 mixture of these three sensitizers.

The amount of initiator which is useful in the photomonomer mixtures is dependent on the desired photo speed at the available optical power present in the source of irradiation and on the desired wall angle and thickness of the polymeric positioning element. In general, less initiator is required for a high brightness, focused source such as a scanned laser beam and more is required for a low brightness source such as a mercury lamp which has been spread out to cover a large area such as a printed circuit board. Useful loadings of photoinitiators, by percent weight of the total monomer mixture layer, are 0.1 to 10% with a preferred range of 0.5 to 8% and a most preferred range of 2 to 6%.

The polymer preferably is a polymer with a molecular weight equal to or greater than about 50,000 and more preferably equal to or greater than 100,000. In the most preferred embodiment of this invention, the polymer material is a photo-polymer which is a crosslinked polymer above its gel point, that is, the molecular weight is essentially infinite. The polymer should be largely amorphous (less than 30% crystallinity) rather than crystalline and its glass transition temperature ($T_g$) should be less than its use temperature in order to ensure that there is a high degree of chain segment mobility.

It is preferred that the crystallinity of the polymer is less than about 25% and more preferred that the crystallinity is less than about 10% in order to obtain a high degree of toughness of the polymer.

Since a useful temperature at which to attach optical fibers to either another optical fiber or to optical waveguide devices is room temperature, it is preferable that the glass transition temperature or $T_g$ of the photopolymer be less than room temperature. Thus, it is preferred that the $T_g$ is less than about 30° C., more preferred less than about 20° C. and most preferred are photopolymer materials whose $T_g$ is less than 10° C. It is preferred that the $T_g$ of the photopolymer be an inherent property of the polymer. However, it is recognized that it is possible to adjust the $T_g$ of a polymer by a number of methods known in the general art of polymer science, such as by the addition of plasticizers or by swelling the polymer with a solvent, and polymers so treated may also be useful in the method of the invention without departing from its scope.

Any unreacted monomer which is trapped within the photopolymer matrix may serve as such a plasticizer material. Further, once the optical fiber is inserted into the channel structure of the invention, it is no longer required that the $T_g$ of the polymer positioning elements fall within the critical range. Such $T_g$ may, at a later time, be adjusted to a higher value as by evaporation of solvent or plasticizer or as by further cross-linking of the polymer. Likewise, though less convenient, a polymer having a $T_g$ greater than room temperature, i.e. above about 30° C., may be employed if the assembly of the device is carried out at elevated temperatures equal to or greater than the $T_g$ of the polymer followed by cooling to a temperature less than the $T_g$.

The polymer which makes up polymeric strips 6 preferably contains a number of crosslinks to prevent overall movement of the polymer chains and thus restore the necessary geometry of polymeric strips 6 after the introduction of an optical fiber into groove 8 between strips 6. This recovery of the shape of strips 6 is associated with the properties of resilience of an elastomeric polymer. In the preferred case, wherein the polymer material which comprises strips 6 is a crosslinked polymer above its gel point, there is, of necessity, a minimum of one primary chemical bond crosslink per polymer chain. In the more preferred compositions at least one of the reactive monomers is a multifunctional monomer, that is, it contains two or more reactive functionalities on the same molecule. When such a multifunctional monomer is present as a major component of the monomer mixture then the resulting polymer will be much more extensively crosslinked and there will be many crosslinks per polymer chain.

The tensile strengths which are displayed by polymers useful in the invention preferably range from about 100 to about 850 kg cm$^2$ with the more preferred range being from about 150 to about 300 kg cm$^2$. The percent elongation of the crosslinked photopolymers useful in the method of the invention preferably ranges from about 2 to about 300% with the more preferred range being about 2 to about 100% due to the increased level of crosslinking in the more preferred compositions. Useful values of hardness preferably range from about 20 to about 200 s (pendulum hardness) with more preferred values being from about 40 to about 150 s.

Once polymerized, the polymeric strips 6 must be flexible to provide some degree of elastic strength to deform under the applied stress when an optical fiber is inserted into groove 8. Also the polymer should not be overly brittle or it will be damaged by the insertion, nor can it be overly hard or it may cause damage to an optical fiber. However, the deformation should not be permanent and the gripper should as rapidly as possible return or substantially return to its original dimensional shape in order to provide for a useful retaining force on the optical fiber.

Substrate 4 can be any solid material used in the formation of substrates for conventional optical devices. Desired characteristics of these materials include mechanical and optical stability at typical operating temperatures of the device, and it is preferably a wafer having an oxide layer of about 2 μm or less.

Preferred materials for use in the fabrication of substrate 4 include printed circuit board material, polymers including polyimide film, quartz, glass, semiconductor wafer, inorganic crystals and silicon. More preferred substrate materials are silicon and quartz. The most preferred substrate material is quartz. Substrate 4 is preferably primed with an appropriate coupling agent to improve adhesion of polymeric strips 6. Suitable coupling agents include silanes such as acryloxypropyltrichlorosilane.

Figure 3:
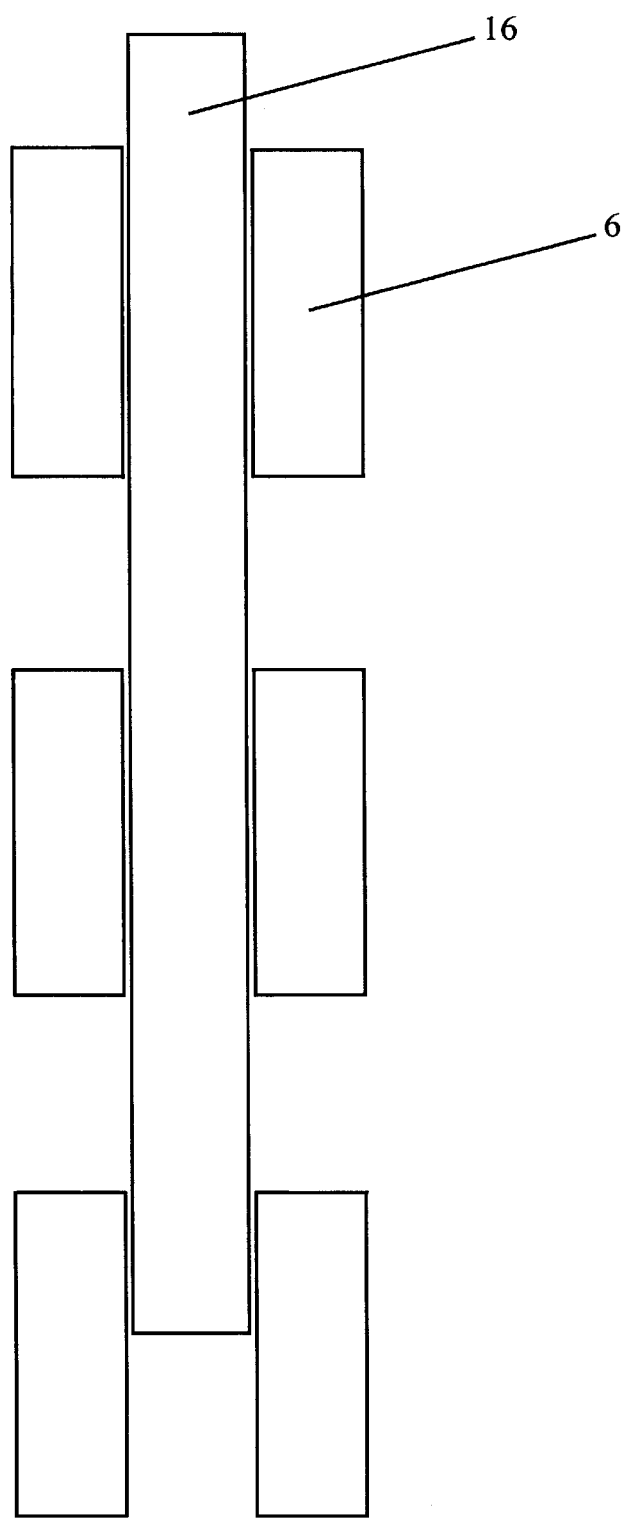
FIG. 3 is an overhead view of dashed segmented grippers holding an optical fiber.
Figure 5:
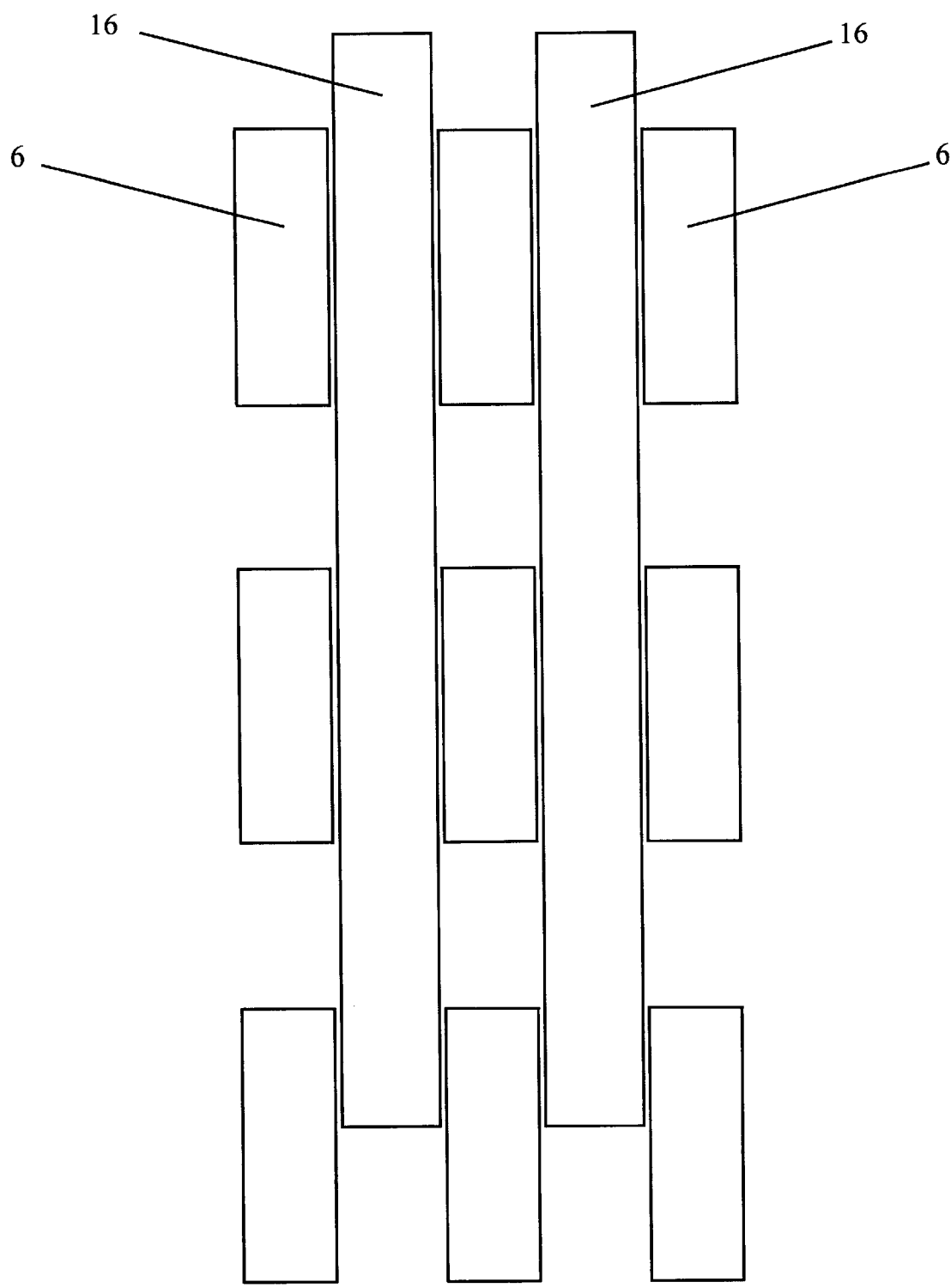
FIG. 5 is an overhead view of an array of dashed grippers holding two optical fibers.

In FIG. 3 is shown a preferred embodiment of the present invention having a collinear array of grippers comprising at least two optical fiber grippers fabricated on a substrate. Such an array has been described herein as a dashed or segmented gripper. Referring to FIG. 1 and FIG. 3, the grippers 2 are positioned on the substrate such that their grooves 8 are collinear, forming a longitudinal array adapted for the insertion of optical fibers. This array allows for greater control over the performance of the fiber splice, namely the lateral alignment, the longitudinal alignment and the collinearity, or angular tolerance, of the splice. Additionally, there may be one or more additional arrays on a single substrate 4 each comprising at least two optical fiber grippers 2 as shown in FIG. 5. Preferably each of the arrays are positioned in parallel to one another.

A number of parameters affect the force which holds the fiber along its length. These include the number of grippers along the fibers length, the length of each gripper, the difference in size of the channels versus the diameter of the fiber 16, the elastic modulus of the polymer, the thickness of each polymer strip 6, and the magnitude of the static friction coefficient between the polymer and glass. These factors may be adjusted together to control the force with which the fiber is held along the direction of its axis. In one preferred embodiment, this force, which arises from static friction, is sufficient to hold the fiber in place during normal handling, but is low enough to allow the fiber to slide along its length under moderate force in order to make close contact with a second fiber or a waveguide that may be fixed in place.

Figure 4:
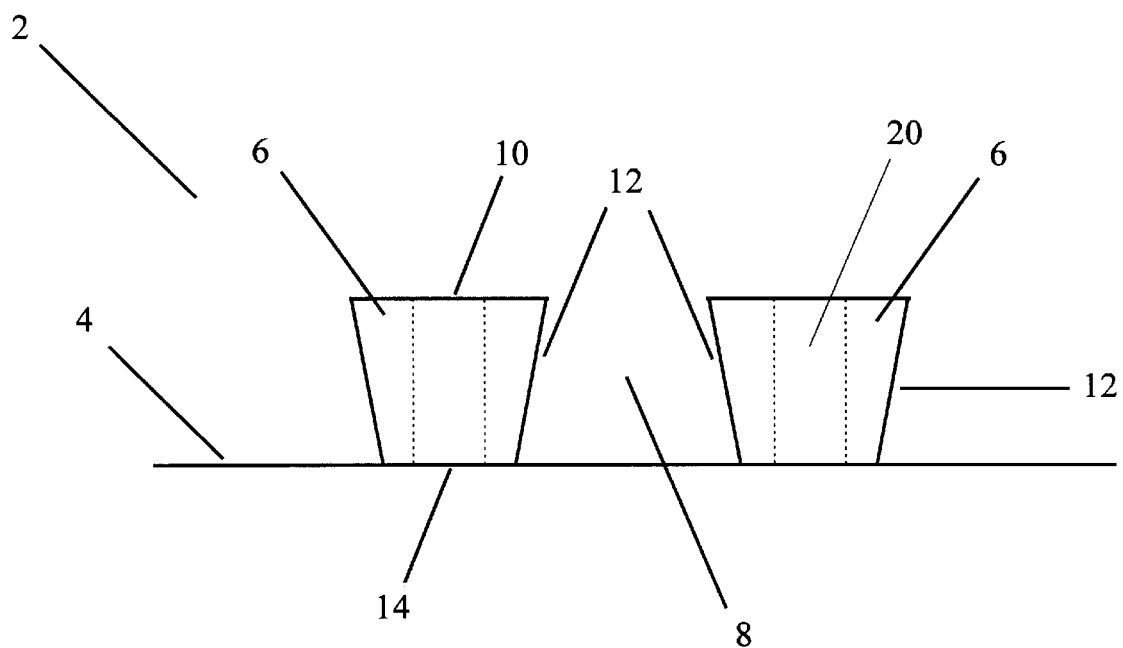
FIG. 4 is an edge view of a gripper, showing a cross-section of two adjacent polymeric strips, and having a highly elastically deformable inner portion between the side walls.

In FIG. 4 there is shown an alternative embodiment wherein an inner portion 20 of each strip 6 is exposed to less actinic radiation than the side walls 12 thereby forming a gripper having an inner portion 20 with a lower elastic modulus. This structure will cause the larger part of any elastic deformation to occur within the inner portion of each strip. This sandwich structure of the strip may be accomplished through a lithographic process using a patterned mask having substantially transparent and substantially opaque areas, wherein the substantially transparent areas have a semi-opaque area which allows a lesser degree of polymerization at an inner portion 20 of strips 6 than at the side walls 12. This embodiment is especially useful when a horizontal array of grippers 2 is on a single substrate. As seen in FIG. 5, such an embodiment comprises a plurality of grippers 2 adjacent to one another such that the polymeric strips 6 which are not the outermost form the side wall 12 for two adjacent grippers having grooves 8. That is, a central polymeric strip 6 is shared by two grippers 2. Thus, if the number of optical fibers to be attached is n, then the number of required strips 6 is n+1. When optical fibers are inserted into the grippers 2, the strips 6 are forced outward by a minor amount. However, when the grippers 2 are arranged in a horizontal array, each subsequent groove 8 becomes more narrow and it becomes more difficult to insert each fiber into the next gripper. Moreover, when the inserted fibers are to be aligned to a fixed array of waveguides, fibers near the outside of the array can be pushed out and laterally misaligned with their corresponding waveguide by the accumulated strain caused by the insertion of the inner fibers of the array. Therefore, it is useful to employ polymeric strips 6 having an elastically deformable inner portion. When employed, the pressure exerted from an inserted optical fiber will cause the inner portion 20 to deform upwards rather than laterally away from the fiber, reducing the affect on adjacent grippers.

Figure 7:
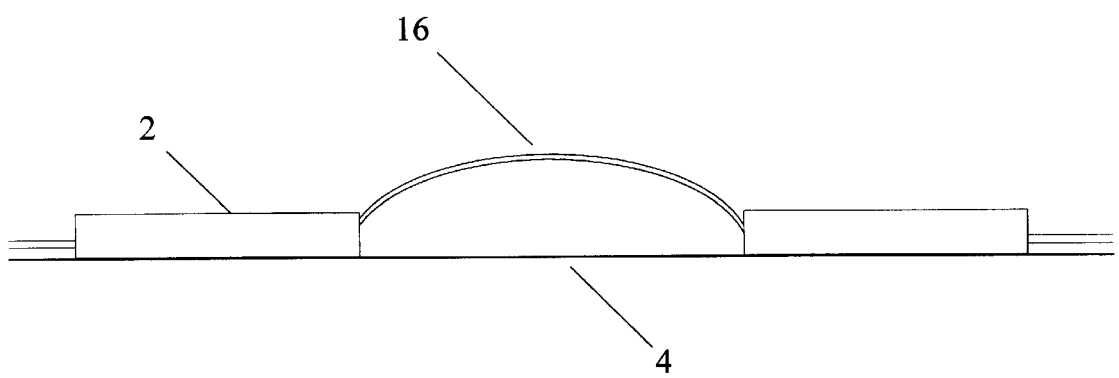
FIG. 7 is a side view of dashed grippers holding an optical fiber wherein a portion of the fiber is bowed at a height over the grippers.

Another alternative embodiment is shown in FIG. 7, wherein an optical fiber may be bowed at a height over the groove 8 of a gripper 2. FIG. 7 shows a fiber bowed between two dashed grippers. This embodiment helps to reduce the stress on the splice and minimize damage to the fiber over time. This splicing element may optionally be encapsulated in a potting material, such as a silicone or an epoxy, to further reduce stress on the splice. A bow in the fiber is further useful when an array of fibers is to be spliced to another array of fibers or wave guides. When such arrays are to be spliced, differences in length between elements of the array can be accommodated by bowing some or all of the fibers.

Figure 8:
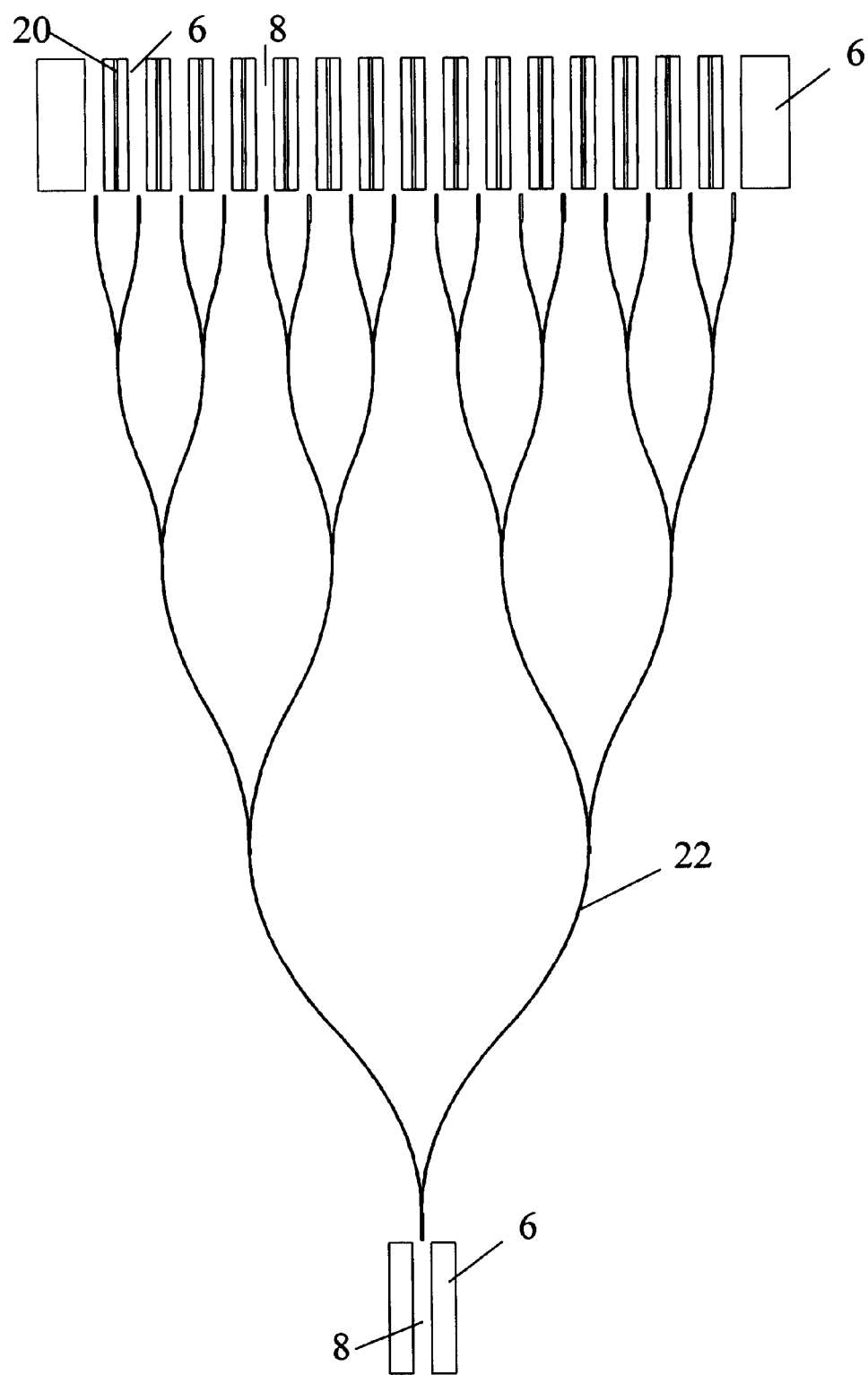
FIG. 8 shows the layout of a 1×6 splitter with integrated gripper array.
Figure 9:
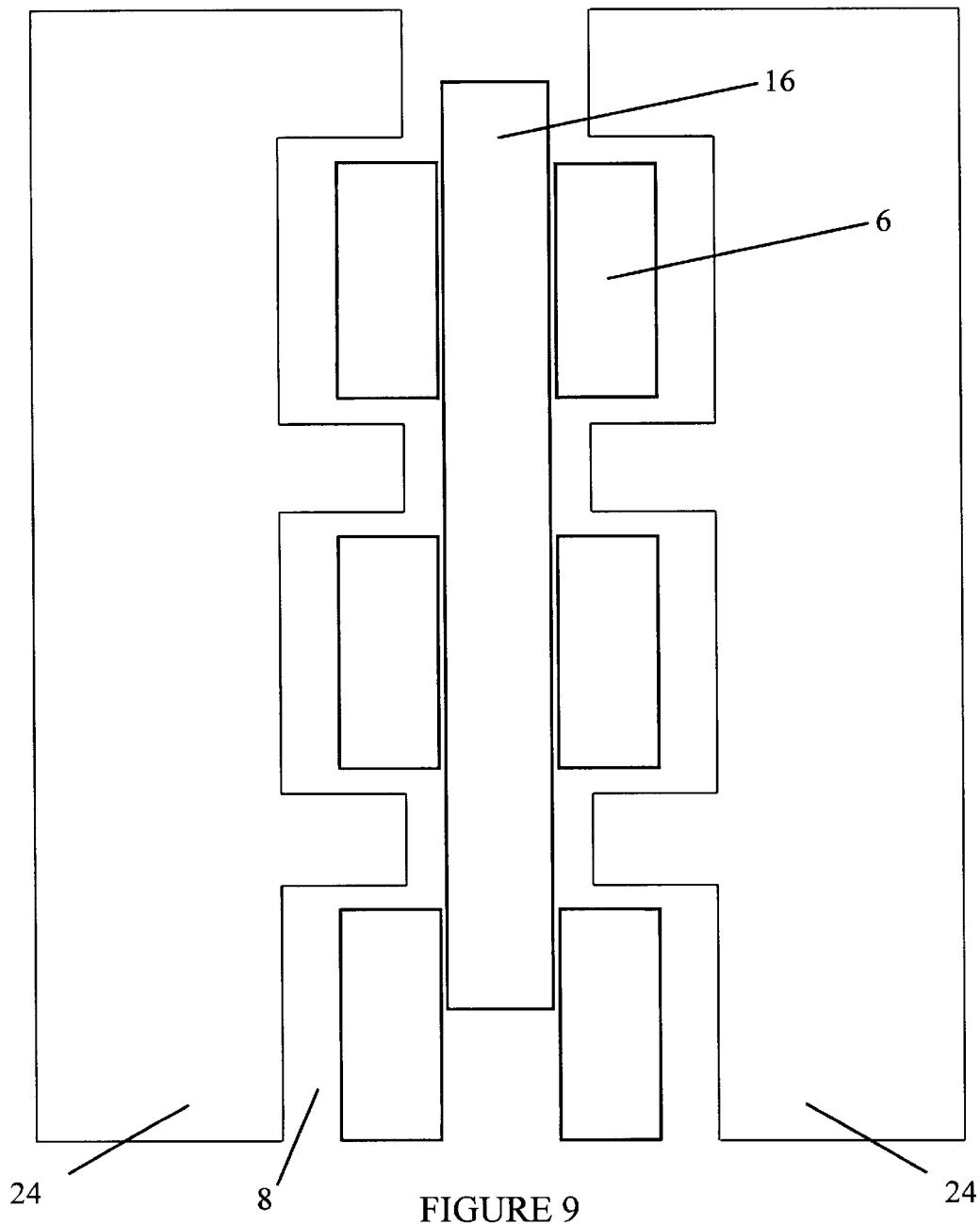
FIG. 9 shows the inclusion of a raised plateau structure to the gripper design which has fingers which are interdigitated with the segmented grippers.

In the embodiments of FIGS. 1–8, careful assembly using a magnified view is required since the dimensions of the fibers and the grippers are small. Much of the difficulty in assembly can be eliminated by the inclusion of a raised plateau structure 24 to the gripper design of FIG. 3 as shown in FIG. 9. The plateau 24 preferably possesses fingers which are interdigitated with the segmented grippers of FIG. 3. The plateau 24 is attached to the substrate and preferably has a height above the substrate which is similar to but greater than the height of the gripper strips 6. During assembly, if the fiber 16 is misaligned with the groove 8 formed by the gripper 6, it will ride on top of the plateau 24. The fiber can be moved laterally by hand until it "finds" the groove and snaps in place. The second fiber can be treated similarly and then pushed along its length until the two fiber endfaces come into proximity. Finally, the fibers can be fixed by an adhesive.

For each of the embodiments of this invention it is possible to employ an index matching fluid as known in the art for reducing back reflection and loss in the splice. This fluid should be applied to the gap between the endfaces of the two spliced fibers or between the endfaces of a fiber and a waveguide. In instances where the splice is to be made permanent, a clear optical adhesive may replace the index matching fluid. While any clear adhesive or fluid provides advantage, the best performance is obtained when the index of refraction of the adhesive or fluid matches the effective index of the fiber or waveguide. Adhesive bonding can be enhanced by pre-treating the glass of the fiber with an adhesion promoter such as a silane compound.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

The following non-limiting examples serve to illustrate the invention.

EXAMPLE 1

A mask was constructed for a 1×16 single-mode splitter having equally spaced waveguides on 250-micron centers at the output. This mask also incorporated a pattern to produce an array of polymeric fiber grippers suitable for aligning and attaching an array of 16 fibers to each of the outputs of the 1×16 splitter. The output portion of the mask contained the features designed to produce the terminal sections of the output waveguides and the fiber-alignment gripper array. The mask was a dark-field mask, where lines and enclosed structures (e.g., closed rectangles) were reproduced on the mask as transparent openings. The mask was designed to allow the attachment of an array of 125-micron diameter fibers. Each gripping element between adjacent fibers was produced by a pair of closely spaced rectangular openings on the mask. These openings were 60 microns wide and were spaced 20 microns apart within the pair, each pair was spaced at 110 microns. Elastomeric gripper elements were formed by exposing a mixture of difunctional acrylic monomers to UV radiation patterned by contact printing through the mask. Vertical spacing elements were employed during exposure to establish a gripper height of about 100 microns. After exposure the mask was removed and the entire 1×16 structure was developed by washing the surface with acetone to remove unreacted monomers. Because the aspect ratio of the groove between each pair of rectangles on the mask was high (20-micron width vs. 100-micron depth), this region of the gripper was not cleared out during development. The result of exposure through the closely spaced pair of mask openings was a single compound gripper element having relatively highly polymerized edge regions with a soft gel-filled inner region (as diagrammed in FIG. 4 and FIG. 8). The exposure and development process resulted in edges (vertical walls) of the grippers which were undercut so that the spacing between gripping elements went from about 110 microns at their top ($w_1$) to about 130 microns at their base ($w_2$). As the fibers were snapped into place within the vertically tapering groove between gripping elements, the necessary compression of the gripper element occurred mainly within the center portion of each gripper, which was filled with gel and significantly softer than the edge portions. The easy deformation of the central region of each gripper relieved the stress, which would have been progressively accumulated as successive fibers were inserted. Alignment of corresponding fibers and waveguides across the array was maintained by minimizing the build-up of stress and by constraining the ends of the array by large monolithic gripper elements produced by the wide rectangles at the endpoints of the array of gripper strips (FIG. 8).

EXAMPLE 2

Polymer grippers were fabricated for use as a low loss mechanical splice between two single-mode fibers. The gripper strips were targeted to be 100 microns tall and 95 microns wide. The gripper consisted of a 10-millimeter long array of twenty segments, each composed of a pair of polymer strips. Within each pair, the strips had a separation of 110 microns at their closest point.

A silicon wafer was carefully cleaned and dried for use as a substrate. A swab was used to apply a thin layer of acryloxypropyltrichlorosilane to one side of the substrate as an adhesion promoter, then the excess was rinsed off with acetone and the wafer was dried with nitrogen. A 2-millimeter thick, chrome, dark-field gripper mask, appropriate for forming the gripper structure of FIG. 3, was employed. The mask was placed on top of the two 100-micron-diameter tungsten wires to establish a gap between the substrate and the mask. Acrylate monomer was applied to the substrate at the edge of the mask, and allowed to seep under the mask by capillary action until the area of the grippers was flooded with monomer. The monomer was then exposed through the mask for 5 seconds with a high-pressure mercury UV lamp with power of 11 milliwatts per square centimeter. The mask and wires were removed and the excess unpolymerized monomer was developed away by gently rinsing the substrate and grippers with methanol for 1–2 minutes. After drying gently with nitrogen, the UV lamp was again used to expose the grippers under nitrogen purge for an additional 10 seconds.

A single-mode fiber of 125-micron diameter was cleaved perpendicular to its axis, and then snapped into place near the midpoint of the gripper. A second fiber was positioned with its cleaved endface opposite to that of the first, snapped down into the gripper and pushed along its axis until it came in close proximity to the first fiber.

The performance of the splice was then tested. Insertion loss at a wavelength of 1550 nm was monitored while the splice was placed on a hot plate and heated from 25° C. to 130° C. and back down to 25° C., repeatedly. Oscillations in the loss appeared as the splice assembly was heated. These oscillations ranged between 0.05 dB and 0.15 dB of loss. It was assumed that as the silicon substrate expanded with the heat, the fiber endface-to-endface separation changed, causing Fabry Perot type variations in insertion loss. This test was repeated with a second splice fabricated in the same manner as the first with the exception that an index-matching optical adhesive was applied around and between the gap between the endfaces of the two fibers. This adhesive was Norland 61, a mercapto-ester type of adhesive designed for optical use. In this case the oscillations with temperature were roughly one tenth of those seen when no adhesive was employed. The average loss was 0.01 dB with temperature-induced oscillations of ±0.005 dB.

What is claimed is:

1. An article coupling a first optical fiber having a free end to a second optical fiber having a free end, the article comprising:

a substrate; and at least one optical fiber gripper on the substrate, wherein the optical fiber gripper includes a pair of generally parallel polymeric side walls which define a groove therebetween, the first optical fiber being inserted in the groove such that a portion of the first optical fiber is bowed at a height over the groove and the free end of the first optical fiber is juxtapositioned with the free end of the second optical fiber when the second optical fiber is inserted in the groove, at least a portion of each of the first optical fiber, the second optical fiber, the at least one optical fiber gripper, and the substrate being encapsulated in a substantially solid mass.

2. The article of claim 1 wherein the at least one optical fiber gripper comprises:

a first optical fiber gripper and a second optical fiber gripper each positioned on the substrate such that the groove of the first optical fiber gripper is generally collinear with the groove of the second optical fiber gripper, and the first optical fiber is bowed at a location disposed between the first optical fiber gripper and the second optical fiber gripper.

3. A method for optically coupling a pair of optical fibers to one another for the transmission of light therebetween, each of the pair of optical fibers being a single-mode optical fiber fabricated from silica and having a free end and a diameter, the method comprising the steps of:

providing a splicing element having a least one optical fiber gripper, the at least one optical fiber gripper defining a pair of polymeric side walls and a floor, the pair of polymeric side walls being disposed generally adjacent to one another and spaced apart sufficiently to receive the free end of each of the pair of optical fibers therebetween, at least a portion of the pair of polymeric side walls tapering toward one another traversing in a direction extending away from the floor, the pair of polymeric side walls defining an opening therebetween opposing the floor, the polymeric side walls having a depth measured between the floor and the opening which is at least one half or greater than the diameter of the single mode optical fiber, the side walls being spaced apart at the opening a distance less than the diameter of the single-mode optical fiber such that the pair of optical fibers may be forcibly inserted through the opening and retained between the pair of polymeric side walls, the pair of polymeric side walls being sufficiently elastic to permit the pair of optical fibers to be inserted through the opening, the pair of side walls and the floor exerting sufficient force on the fibers to maintain alignment and colinearity between the free ends of the pair of optical fibers such that the light transmitted between the pair of optical fibers exhibits about 0.1 dB or less average coupling loss; and positioning the free end of each of the pair of optical fibers within the at least one optical fiber gripper such that the light is transmitted between the pair of optical fibers with about 0.1 dB or less average coupling loss.

4. The method of claim 3 wherein at least one of the pair of optical fibers is moved axially relative to the other until the pair of optical fibers is separated by a distance of about 10 $\mu$m or less measured between the free ends of the pair of optical fibers.

5. The method of claim 3 wherein the step of providing a splicing element comprises the steps of:

providing a substrate having a surface;

substantially uniformly depositing a photopolymerizable composition onto the substrate;

exposing the photopolymerizable composition to actinic radiation to define image areas and non-image areas; and removing the photopolymerizable composition corresponding to the non-image areas while leaving the photopolymerizable composition corresponding to the image areas to form the at least one optical fiber gripper on the substrate, the optical fiber gripper consisting of generally parallel polymeric strips attached to the surface of the substrate and defining a top surface oriented generally in a plane parallel to the substrate and the side walls generally confronting one another.

6. The method of claim 5 wherein confronting portions of the pair of polymeric side walls are exposed to less actinic radiation than remaining portions of the generally parallel polymeric strips to provide an deformable inner portion of the pair of polymeric side walls.

7. The method of claim 3 wherein the step of providing a splicing element comprises the steps of:

providing a substrate having a surface;

substantially uniformly depositing a polymerizable composition onto the substrate;

embossing a pattern in the polymerizable composition to form the at least one optical fiber gripper on the substrate; and curing the polymerizable composition.

8. The method of claim 3 wherein the free ends of the pair of optical fibers define a gap therebetween, the method further comprising the step of:

disposing a substance within the gap, the substance being selected from a group consisting of an adhesive or an index-matching fluid.

9. A splicing element for optically coupling a pair of optical fibers to one another for the transmission of light therebetween, each of the pair of optical fibers being a single-mode optical fiber fabricated from silica and having a free end and a diameter, the splicing element comprising:

a substrate; and at least one optical fiber gripper on the substrate, the at least one optical fiber gripper defining a pair of polymeric side walls and a floor, the pair of polymeric side walls being disposed generally adjacent one another and spaced apart sufficiently to receive the free end of each of the pair of optical fibers therebetween, at least a portion of the pair of polymeric side walls tapering toward one another traversing in a direction extending away from the floor, the pair of polymeric side walls defining an opening therebetween opposing the floor, the polymeric side walls having a depth measured between the floor and the opening which is at least one half or greater than the diameter of the single mode optical fiber, the side walls being spaced apart at the opening a distance less than the diameter of the single-mode optical fiber such that the pair of optical fibers may be forcibly inserted through the opening and retained between the pair of polymeric side walls, the pair of polymeric side walls being sufficiently elastic to permit the pair of optical fibers to be inserted through the opening, the pair of side walls and the floor exerting sufficient force on the fibers to maintain alignment and colinearity between the free ends of the pair of optical fibers such that the light transmitted between the pair of optical fibers exhibits about 0.1 dB or less average coupling loss.

10. The splicing element of claim 9 wherein the pair of side walls are formed from a polymeric material and each of the pair of side walls defines a portion where the polymeric material has a lesser degree of polymerization than remaining portions of the pair of side walls.

11. The splicing element of claim 9 wherein the pair of side walls are formed from a polymeric material which is either exposed to actinic radiation or cured or both, and each of the pair of side walls defines a portion where the polymeric material has a lesser degree of exposure to actinic radiation or curing or both than remaining portions of the pair of side walls.

12. The splicing element of claim 9 wherein the pair of side walls are formed from a polymerized material and each of the pair of side walls defines an inner portion where the polymerized material has a lesser degree of polymerization than remaining portions of the pair of side walls.

13. An article coupling an optical fiber having a free end to a optical waveguide having an exposed end, the article comprising:

a substrate; and at least one optical fiber gripper on the substrate, wherein the optical fiber gripper includes a pair of generally parallel polymeric side walls which define a groove therebetween, the optical fiber being inserted in the groove such that a portion of the optical fiber is bowed at a height over the groove and the free end of the optical fiber is juxtapositioned with the exposed end of the optical waveguide, at least a portion of the optical fiber, the optical waveguide, the optical fiber gripper, and the substrate being encapsulated in a substantially solid mass.

14. The article of claim 13 wherein the waveguide has a cross-sectional shape which is substantially parabolic, Gaussian, trapezoidal, square, rectangular, or hemispherical.

15. An article coupling an optical fiber having a free end to a optical waveguide having an exposed end, the article comprising:

a substrate; and at least one optical fiber gripper on the substrate, wherein the optical fiber gripper includes a pair of polymeric side walls which define a groove therebetween, the optical fiber being inserted in the groove such that a protion of the optical fiber is aligned with the exposed end of the optical waveguide, a portion of each of the polymeric side walls confronting the groove being generally more pliant and deformable than the remaining portions of the generally parallel polymeric side walls.

16. The article of claim 15 wherein the polymeric side walls of the optical fiber gripper are fabricated by exposing the polymeric side walls to actinic radiation, and wherein the portion which is generally more pliant and deformable is exposed to less actinic radiation than the remaining portions of the polymeric side walls.

17. The article of claim 15 wherein the polymeric side walls of the optical fiber gripper are fabricated by curing the polymeric side walls, and wherein the portion which is generally more pliant and deformable is cured less than the remaining portions of the polymeric side walls.

\* \* \* \* \*